United States Patent Office.

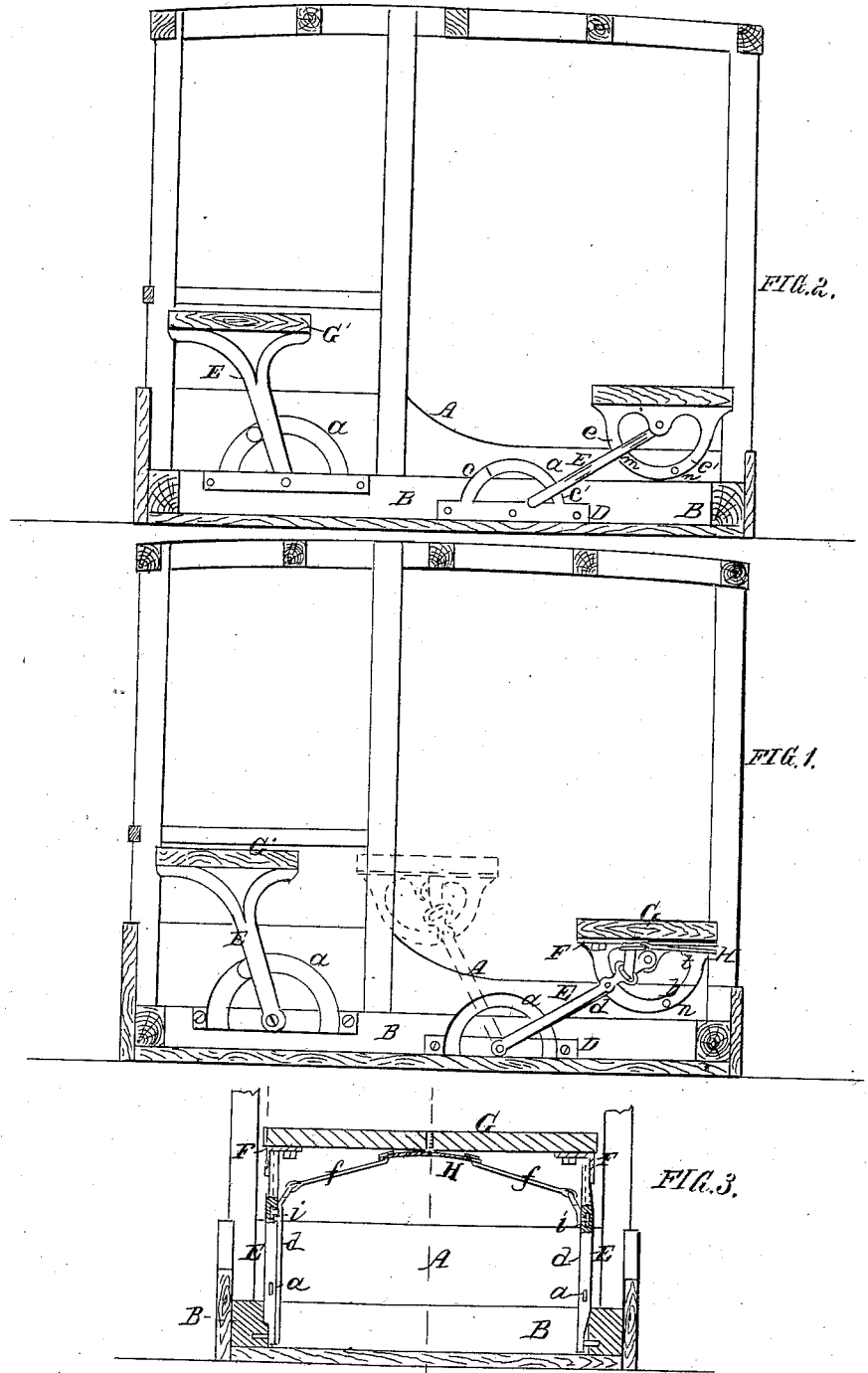

JAMES FLEMING, OF PHILADELPHIA, PENNSYLVANIA, ASSIGNOR TO GARDNER AND FLEMING, OF SAME PLACE.

*Letters Patent No. 76,428, dated April 7, 1868.*

IMPROVEMENT IN ADJUSTABLE SEAT FOR CARRIAGES.

*The Schedule referred to in these Letters Patent and making part of the same.*

TO ALL WHOM IT MAY CONCERN:

Be it known that I, JAMES FLEMING, of Philadelphia, Pennsylvania, have invented an Improvement in Adjustable Seats for Vehicles; and I do hereby declare the following to be a full, clear, and exact description of the same.

My invention consists of a seat constructed and applied to a vehicle, substantially as described hereafter, so that the said seat may either be securely fastened in the position required to accommodate the driver, or may be adjusted in a position adjacent to the dasher-board when a front seat is not needed, or to afford a free passage to or from the vehicle.

In order to enable others skilled in the art to make and use my invention, I will now proceed to describe its construction and operation, reference being had to the accompanying drawing, which forms a part of this specification, and in which—

Figures 1 and 2 are sectional elevations of the body of a carriage with my improved adjustable seat, and Figure 3 a transverse section.

A is the body of a carriage, to the inner side of each side-piece B of which is secured a metal plate, D. To each plate D is jointed the lower end of an arm, E, through an opening, in which extends a curved guide, $a$, attached to the plate D; and on the outer side of the guide are two shoulders, $c\ c'$, which limit the movements of the arm E, as fully described hereafter. Each arm is jointed at its upper end to a plate, F, secured to the under side of a seat, G; and through an opening in the arm, near its outer end, extends a curved guide, $b$, attached to the plate F, and on the inner side of which are two shoulders, $e\ e'$. To the inner side of each arm E is secured one end of a flat spring, $d$, a pin, $i$, on which projects through an opening in the arm, and is adapted to openings $m\ n$ in the adjacent guide $b$; and through slots in the upper ends of the springs pass flexible bands $f$, the inner ends of which are secured to a lever, H, hung to the under side of the seat G, the said lever having an arm, $t$, extending towards the front of the seat, as shown in figs. 2 and 3.

When the seat is in the proper position to accommodate the driver, the arms E rest against the shoulders $c$ of the guides $a$, and the shoulders $e'$ of the guides $b$ bear against the arms, as shown in dotted lines, fig. 1, the seat G occupying a horizontal position, in which it is firmly locked by the pins $i$ projecting into the openings $n$ in the guides $b$.

If it is not desired to use the seat G, or when a free passage to and from the vehicle is required, the bands $f$ are drawn inwards, by operating the lever H, so as to draw back the springs $d$ and remove the pins $i$ from the openings $n$. The seat is then turned until the shoulders $e$ strike the arms E, and is at the same time carried forward towards the dasher-board until the arms E are brought against the shoulders $c'$ of the guides $a$, as shown in fig. 2. When thus adjusted, the seat is secured by the pins $i$, which, as the openings $m$ are brought opposite the same, are forced, by the springs $d$, into the said openings; the seat being thus maintained in a horizontal position, so as to serve as a receptacle for baggage or as a seat for children.

It will be seen that the arms and guides may be secured to vehicles and seats of the ordinary construction without making any alterations in the same, and with but little labor, and at a comparatively slight cost.

Although I prefer that the guides should extend through openings in the arms, they may each occupy a position at the side of one of the arms; and, if desired, other devices for locking the seat after adjustment may be substituted for the spring-catches described.

I claim as my invention, and desire to secure by Letters Patent—

The seat G, hung to arms E E hinged to the body of a vehicle, in combination with guides or plates having stops $c\ c'$, $e\ e'$, and secured to the body of the vehicle and to the seat, so that the seat is retained in its horizontal position both when adjusted to accommodate the driver and when adjacent to the dasher-board, as described.

In testimony whereof, I have signed my name to this specification in the presence of two subscribing witnesses.

JAMES FLEMING.

Witnesses:
  JOHN WHITE,
  W. J. R. DELANY.